United States Patent [19]
Casey

[11] Patent Number: 4,587,512
[45] Date of Patent: May 6, 1986

[54] TURN SIGNAL ALARM

[76] Inventor: Harold W. Casey, 10800 U.S. Hwy. 19 S., Pinellas Park, Fla. 33565

[21] Appl. No.: 652,213

[22] Filed: Sep. 20, 1984

[51] Int. Cl.$^4$ .............................................. B60Q 1/44
[52] U.S. Cl. .................. 340/52 D; 180/272; 200/61.89; 307/10 LS; 340/55; 340/67; 340/69; 340/71; 340/73; 340/75
[58] Field of Search ................... 340/52 D, 67, 69, 71, 340/55-56, 62, 66, 72-76, 79, 81 R, 81 F; 200/61.89, 61.27, 61.29; 180/271, 272, 282; 307/10 LS

[56] References Cited
U.S. PATENT DOCUMENTS

| | | | |
|---|---|---|---|
| 3,581,278 | 5/1971 | Huffman | 340/71 X |
| 3,771,122 | 11/1973 | Sattler | 340/75 X |
| 3,778,763 | 12/1973 | Johns et al. | 340/67 X |
| 4,403,210 | 9/1983 | Sullivan | 340/67 X |

Primary Examiner—Glen R. Swann, III
Assistant Examiner—Thomas J. Mullen, Jr.
Attorney, Agent, or Firm—Ronald E. Smith

[57] ABSTRACT

A safety-promoting device provided in the form of an electrical circuit that reminds vehicle operators to use the turn signals supplied with the vehicle in a safe manner. The circuitry has no effect where the operator properly begins signaling a turn prior to the commencement of a braking operation associated with a turn, but causes the immediate activation of a reminder bell where a braking operation is not accompanied by use of the turn signals. If a preselected amount of time passes while the driver persists in braking in the absence of turn signal activation, the front and rear turn signal lights will begin flashing to warn other drivers that the vehicle is stopping.

4 Claims, 1 Drawing Figure

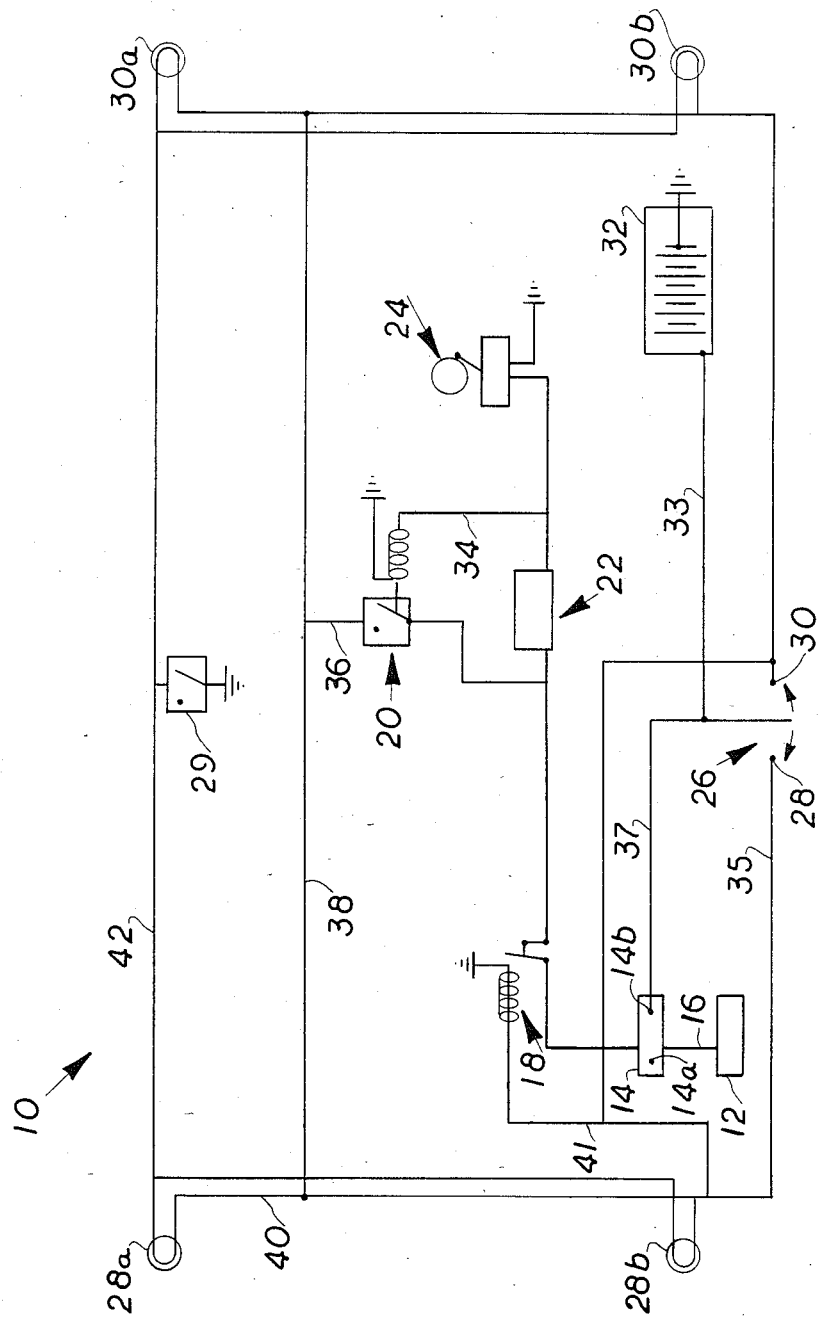
THE FIG.

TURN SIGNAL ALARM

BACKGROUND OF THE INVENTION

1. Field of the Invention

This invention relates to devices intended to promote traffic safety in general. More specifically, it relates to devices promoting proper use of turn signal lights and in particular it relates to an electrical device that initiates a gong or bell the moment pressure is applied to a vehicle's brake pedal in the absence of prior turn signal activation and which device incorporates a timer that initiates flashing of the vehicle's directional lights if a vehicle operator undertakes a prolonged braking action in the absence of any turn signal usage.

2. Description of the Prior Art

A search of U.S. patents that was conducted prior to the filing of this disclosure indicated that the following patents have been issued heretofore in the field of this invention: U.S. Pat. No. 3,281,786 to Leichsenring, which shows a system where lights are used to indicate whether a vehicle is being braked, going faster than a predetermined speed or going slower than a predetermined speed; U.S. Pat. No. 3,492,639 to Bevacqua where a system that causes all four (4) turn signals of a vehicle to flash when the emergency brake of the vehicle is engaged and a turn signal has been activated is disclosed; U.S. Pat. No. 3,912,892 to Morehouse showing a means whereby brake lights are activated when pressure is removed from the accelerator pedal of a vehicle. and U.S. Pat. No. 4,170,723 to Arsoy where is shown a means to make the taillights of a vehicle glow more brightly in response to hard braking.

The art does not teach or suggest any means whereby proper usage of turn signals is promoted. Vehicles of all types have been provided with turn signals for many years, but many members of the public either ignore their use altogether or use them improperly. Perhaps the most common form of turn signal misuse is the practice of activating the appropriate turn signal only after the vehicle has been braked for an extended period of time and the turn is actually being made. This form of use is worthless as it is obvious that a turn is being made by the time the turn signals are activated. Since it is the purpose of the turn signals to give other vehicle operators advance warning of one's intentions, a warning given when one's intentions are readily apparent is no warning at all.

There is a clear need for a device that will remind forgetful drivers that their vehicles are in fact equipped with turn signals that should be used in a manner that will promote safety on the highways, but the art includes no devices that fulfill the need or suggest how the need could be fulfilled.

SUMMARY OF THE INVENTION

The subject invention includes a means for initiating the simultaneous, in unison flashing of all of a vehicle's forward and rearward turn signal lights whenever a driver brakes for a predetermined period of time while making no use of the vehicle's turn signals. An adjustable timer enables the amount of time between the onset of braking and the activation of the flashing, if no turn signals are used, to be set at a predetermined length of time. Where three (3) seconds has been selected, for example, a flasher is activated if the driver brakes the vehicle for three (3) continuous seconds and makes no use of the vehicle's turn signals. If the driver uses a turn signal before the three (3) seconds has elapsed, then the timer is reset and the flasher is deactivated.

The invention also includes a means for activating a chime, gong or bell instantly if pressure is applied to a brake pedal in the absence of prior turn signal light activation. In this manner, a forgetful driver will be reminded to activate his or her turn signals if in fact a turn is contemplated. The circuitry that initiates the aforementioned flashing of turn signal lights also deactivates the chime.

A battery provides power to the active elements of the circuitry that accomplish the objects of the invention. A switch is disposed between the battery and the brake pedal of the vehicle so that current begins flowing to a bell, activating the same, the moment the brake pedal is touched in the absence of directional switch activation. A pair of solenoids are serially connected to the switch, as is a timer means. When the brake pedal is depressed and no turn signal is activated, the current flowing through the timer activates it and starts the running of the preselected time period. When the amount of preselected time has elapsed, the timer deactivates the chime or bell and activates the vehicle's existing flasher means which initiates flashing of the vehicle's front and rear turn signal lights. However, activation of a turn indicator at any time before the flasher is activated will shut down the timer and cause it to reset to no time elapsed.

It is the primary object of this invention to provide a means whereby the proper and therefore safe use of turn signals will be promoted on the highways.

Another object is to provide the needed means in the form of circuitry that can be economically installed as a part of original equipment at the time of manufacture, or which may be retrofit into existing conventional vehicles.

The invention accordingly comprises the combination of elements, features of construction, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

The FIGURE is a schematic diagram of the circuitry that accomplishes the objects of this invention.

DETAILED DESCRIPTION OF THE PREFERRED EMBODIMENT

Referring now to the drawing, it will there be seen that an electrical circuit that will accomplish the objects of the invention is designated by the reference numeral 10 as a whole.

A conventional brake pedal 12 is connected to a normally closed pneumatic switch 14 having terminals 14a, 14b through brake line tubing 16. Both terminals are connected to brake line tubing 16 through a "T" connection so that depression of pedal 12 activates the switch. Terminal 14b is additionally connected to a source of DC voltage as will be set forth hereinafter. A plurality of other normally closed devices are serially connected to the switch 14; specifically, normally closed solenoid 18, normally closed solenoid 20, a normally closed timing means 22, and a bell or chime means 24. All of these elements are in their normal, deactivated state if (1) no pressure appears on brake pedal 12, or (2) pressure appears on brake pedal 12 but a directional signal has been activated by the operator of the vehicle prior to the moment that such pressure was applied to the brake pedal.

Directional switch 26 has a first terminal 28 serially connected to the front turn signal lamp 28a and to the rear turn signal lamp 28b and a second terminal 30 serially connected to the front turn signal lamp 30a and to the rear turn signal lamp 30b. Thus, if the operator of the vehicle has activated the left turn signal lamps 28a, 28b by depressing the turn signal indicator in the well known manner prior to the time the foot pedal 12 is depressed, then a circuit is completed from twelve (12) volt battery 32 to ground through line 33, the directional switch terminal 28, line 35, the lamps 28a, 28b and a flasher means 29. Since switch 14 is normally closed and brake pedal 12 has not been depressed in this example, the normally closed state of the solenoids 18, 20, the timer 22 and the bell 24 is not changed.

It will be noted, however, that activation of the brake pedal 12 in the absence of activation of directional switch 26 will supply power from battery 32 to normally closed solenoid 18 through lines 33, 37 and 39. In view of the aforesaid serial connection, power is also supplied to timer means 22 and activates the same. Simultaneously, power is fed to the bell 24 and the driver of the vehicle is thereby reminded that the brake pedal of the vehicle has been depressed but no directional signal has been activated. The timer 22 may be adjusted to time intervals between 0–30 seconds. After the preselected amount of time has passed, timer 22 sends a signal to ground through flasher means 29 via lines 36,38,40,42, activating the same and deactivating the bell 24.

Where the brake pedal 12 is first depressed and the directional switch 26 is thereafter activated, at a time prior to the activation of the flasher, the power to the flasher and to the chime is cut off. This occurs because the initial activation of the timer 22 was in response to the occurence of pressure in brake line tubing 16. When the directional switch 26 is thrown in either direction, current flow commences through line 35 (assuming a left turn) to activate turn lamps 28a, 28b and through line 41 to open solenoid 18 to accomplish the desired shut down. The opening of solenoid 18 causes solenoid 20 to open as well. Timer 22 is thereby deprived of power and no signal can emit therefrom to activate the flasher 29.

When the vehicle operator removes pressure from pedal 12 before flasher 29 is activated, the timer is reset by suitable means and the time starts at no elapsed seconds when the pedal is depressed at a later time.

In summary, the instant sound of a chime responsive to depression of a brake pedal in the absence of directional switch activation will remind the driver to activate the vehicle's turn signals if in fact the brake pedal was depressed as the first step in a turning procedure. Accordingly, the owner of a vehicle equipped with the inventive circuitry will become accustomed to activating the proper turn signal before touching the brake pedal. The circuitry also provides the desireable flashing of turn signal lamps when a stop is being made in the absence of turning while simultaneously terminating the sounding of the audible bell or chime. In this manner, the objects of the invention are achieved in an economical manner and the safety of land vehicle travelers is enhanced.

It will thus be seen that the objects set forth above, and those made apparent by the foregoing description, are efficiently attained, and since certain changes may be made in the above construction without departing from the scope of the invention, it is intended that all matters contained in the foregoing description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
That which is claimed is:

1. A safety mechanism for vehicles equipped with a depressable brake pedal, left and right turn signal lights, a directional switch for selectively activating the turn signal lights, and a flasher means for effecting synchronous flashing of said turn signal lights, comprising:
    a pressure sensitive switch means that is operably connected to said brake pedal and which is activated in response to pressure applied to said brake pedal,
    a first relay means electrically connected to said pressure sensitive switch means,
    a timer means electrically connected to said pressure sensitive switch means,
    said timer means adapted to measure preselected periods of time and to generate an electrical signal at the expiration of the measured period of time,
    a second relay means electrically connected to said first relay means and disposed in shunting relation to said timer means,
    an audible alarm means electrically connected to said pressure sensitive switch means,
    a source of power electrically connected to said pressure sensitive switch means, said timer means and said alarm means through said first relay means so that depression of said brake pedal in the absence of prior directional switch activation serves to activate said alarm means and said timer means,
    said alarm means being activated to advise a person operating a vehicle equipped with said safety mechanism that said directional switch has not been properly activated,
    said timer means electrically connected to said flasher means so that said flasher means is activated by said timer means at the expiration of the time measured by said timer means to thereby effect synchronous flashing of all of the turn signal lights of said vehicle,
    said source of power electrically connected to said first relay means through said directional switch so that said first relay means is tripped in response to activation of said directional switch which in turn effects tripping of said second relay means and the deactivation of said timer means and alarm means.

2. The mechanism of claim 1, wherein said source of power is a twelve volt DC battery member.

3. The mechanism of claim 1, wheren said first and second relay means are normally closed solenoid members.

4. The mechanism of claim 1, wherein said alarm means is a bell.

* * * * *